United States Patent
Somberg

(10) Patent No.: US 12,521,357 B2
(45) Date of Patent: Jan. 13, 2026

(54) INTRAVENOUS DOFETILIDE TO CONVERT ATRIAL FIBRILLATION/FLUTTER

(71) Applicant: Hyloris Developments SA, Liège (BE)

(72) Inventor: John Somberg, Lake Forest, IL (US)

(73) Assignee: Hyloris Developments SA, Liege (BE)

( * ) Notice: Subject to any disclaimer, the term of this patent is extended or adjusted under 35 U.S.C. 154(b) by 0 days.

(21) Appl. No.: 18/176,017

(22) Filed: Feb. 28, 2023

(65) Prior Publication Data

US 2024/0285559 A1 Aug. 29, 2024

(51) Int. Cl.
| | |
|---|---|
| *A61K 31/18* | (2006.01) |
| *A61B 5/00* | (2006.01) |
| *A61B 5/361* | (2021.01) |
| *A61K 9/00* | (2006.01) |

(52) U.S. Cl.
CPC ............ *A61K 31/18* (2013.01); *A61B 5/361* (2021.01); *A61B 5/4839* (2013.01); *A61K 9/0019* (2013.01); *A61K 9/0053* (2013.01)

(58) Field of Classification Search
CPC .... A61K 31/18; A61K 9/0019; A61K 9/0053; A61B 5/361; A61B 5/4839
See application file for complete search history.

(56) References Cited

U.S. PATENT DOCUMENTS

| | | | |
|---|---|---|---|
| 11,364,213 B2 | 6/2022 | Somberg | |
| 2021/0346325 A1* | 11/2021 | Somberg | A61K 9/08 |
| 2023/0172883 A1* | 6/2023 | Kashfian | A61K 31/18 |
| | | | 514/603 |

OTHER PUBLICATIONS

Singh, S. et al. "Efficacy and safety of oral dofetilide in converting to and maintaining sinus rhythm in patients with chronic atrial fibrillation or atrial flutter: the symptomatic atrial fibrillation investigative research on dofetilide study." Circulation, 2000, vol. 02, No. 19: pp. 2385-2390. (Year: 2000).*
January, C. T. et al. "2014 AHA/ACC/HRS guideline for the management of patients with atrial fibrillation: a report of the American College of Cardiology/American Heart Association Task Force on practice guidelines and the Heart Rhythm Society." Circulation, 2014, vol. 130, No. 23: e199-267. (Year: 2014).*
Zou, H. et al. "Application of Pharmacokinetic-Pharmacodynamic Modeling in Drug Delivery: Development and Challenges." Frontiers in pharmacology, 2020, vol. 11, No. 997. (Year: 2020).*
Walpole, C. et al., The weight of nations: an estimation of adult human biomass, BMC Public Health 2012, 12, 439.
Frost, L. et al., Efficacy and safety of dofetilide, a new class III antiarrhythmic acent, in acute termination of atrial fibrillation or flutter after coronary artery bypass surgery, Int. J. Cardiology 1997, 58, 135-140.
U.S. Appl. No. 18/162,092 Office Action mailed Sep. 8, 2023.
U.S. Appl. No. 18/175,971 Office Action mailed Sep. 11, 2023.

* cited by examiner

*Primary Examiner* — Jean P Cornet
*Assistant Examiner* — Chihyi Lee
(74) *Attorney, Agent, or Firm* — Vance Intellectual Property, PC

(57) ABSTRACT

The invention involves a novel method of converting atrial fibrillation (AF) or atrial flutter (AFL) in a patient presenting with highly symptomatic AF or AFL by administering at least a loading dose of dofetilide intravenously, or if that fails cardioversion and a maintenance infusion followed by a switch to chronic oral dosing.

20 Claims, 1 Drawing Sheet

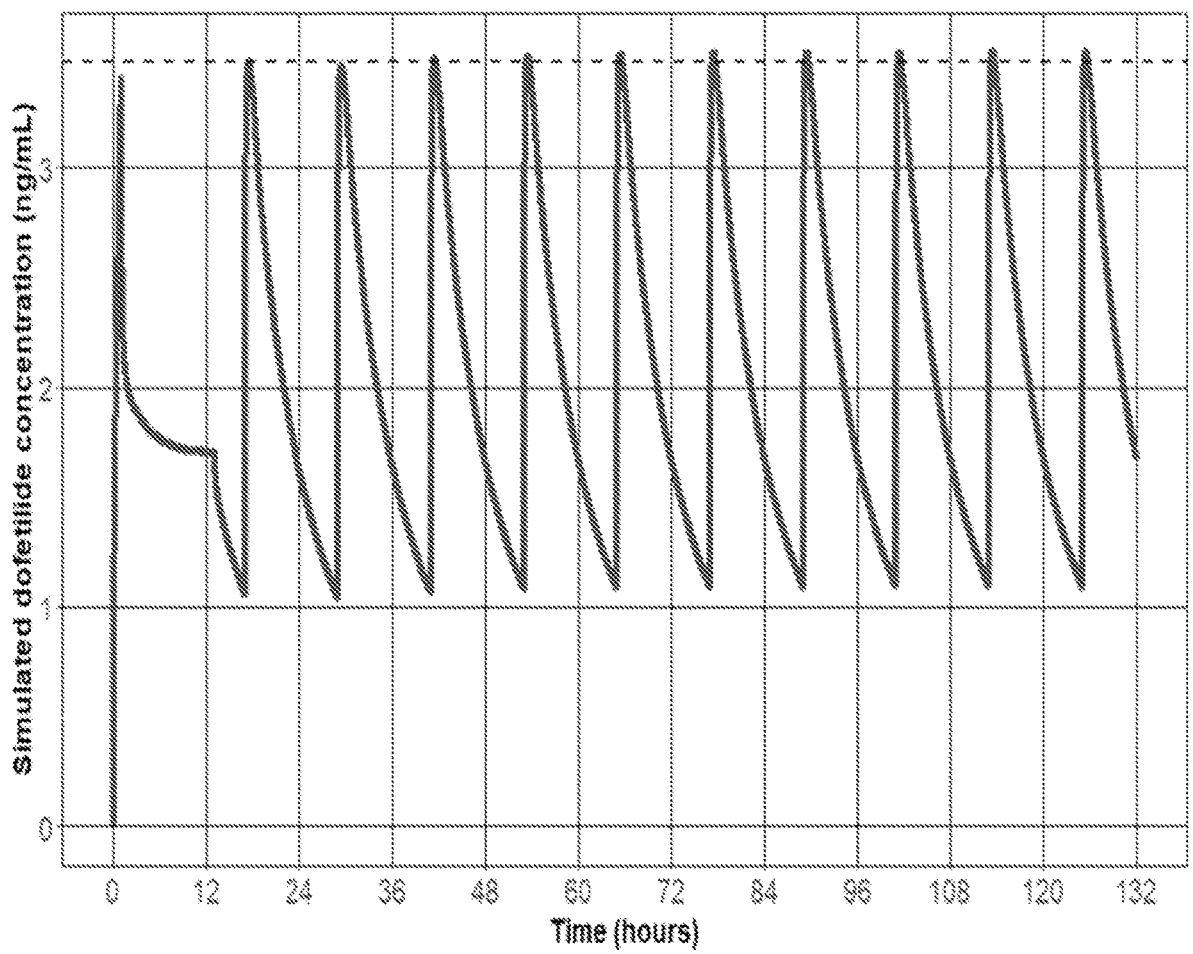

INTRAVENOUS DOFETILIDE TO CONVERT ATRIAL FIBRILLATION/FLUTTER

FIELD OF THE INVENTION

The invention involves a novel method of administering dofetilide intravenously to convert atrial fibrillation (AF) or atrial flutter (AFL) in patients presenting with highly symptomatic AF or AFL.

BACKGROUND OF THE INVENTION

Dofetilide is an anti-arrhythmic of the Vaughn Williams Class III. Its action is to prolong the action potential duration, specifically by prolonging repolarization time. Dofetilide does this by blocking the outward potassium channel IKr (rapid potassium rectifier current). This action is both anti-arrhythmic and pro-arrhythmic. Excessive prolongation of the repolarization time may give rise to life threatening arrhythmias, especially those called Torsade de Pointe ventricular tachycardia (Tpd). The repolarization time of cardiac cells may be manifest on the body surface ECG (electrocardiogram) by an increase in the QT interval. Since the QT interval varies with heart rate, often the QT interval is measured as the heart rate corrected QT, called the $QT_c$. Prolongation of the $QT_c$ interval by pharmaceutical agents may give rise to arrhythmias. Thus, in the initial loading phase, or in a dose escalation procedure, it is critical to monitor the $QT_c$ interval to avoid excessive $QT_c$ prolongation and thus the possible development of life threatening ventricular tachycardia's, especially those of the Tdp variety. For these reasons the FDA has mandated in-hospital $QT_c$ monitoring in initial dofetilide loading or for dose escalation. But, for a patient in need of chronic dofetilide therapy (e.g., a patient who presents with intermittent AF but who is in current sinus rhythm), it takes at least 3 days for oral dofetilide to reach a steady state concentration and thus for the concentration to be reflected in full expression in $QT_c$ prolongation. Patients, therefore, typically require a 3 day hospital stay to prevent endangering themselves to possible arrhythmias occurring outside the hospital where help is often not available.

The relationship between blood concentration of dofetilide and $QT_c$ can be expressed as: $QT_c$=baseline $QT_c$+ (slope relationship×blood dofetilide concentration). The relationship between dofetilide plasma concentration and $QT_c$ has been previously established. The $QT_c$ changes between 15-25 msec/ng/ml (average=20 msec) as reported by Sedgwick et al, Br J. Clin Pharmacol 1991:31:515-519. Thus, for a patient with an initial $QT_c$ of 405 msec QT who received an IV dose of 2.4 µg/kg, which would be analogous to a chronic dose of 500 µg bid, it would be expected to show a $QT_c$ of 459 msec on average, a 13% increase over baseline, within acceptable limits.

$$QT_c = 405 \text{ msec} + (20 \text{ msec/ng/mL} \times 2.7 \text{ ng/mL}) = 459 \text{ msec}$$

When administering dofetilide, a physician first assesses the $QT_c$ interval. If the $QT_c$ is greater than 440 msec (500 msec in patients with ventricular conduction abnormalities), dofetilide is not indicated. The physician then calculates the patient's creatinine clearance (CrCl, which is a useful approximation of the glomerular filtration rate (GFR)) employing the following formulas:

Creatinine clearance (male) =

$$((140 - \text{Age}) \times \text{Body Wt (kg)}) / (72 \times \text{serum creatinine (mg/dL)})$$

Creatinine clearance (female) = Creatine clearance (male) × 0.85

Following calculation of CrCl, the starting dose of dofetilide is determined as shown below.

| Creatinine Clearance (CrCl) | Starting Dose of Dofetilide |
|---|---|
| 60 mL/min or more | 500 µg bid |
| 40-<60 mL/min | 250 µg bid |
| 20-<40 mL/min | 125 µg bid |
| <20 mL/min | Dofetilide not indicated |

The physician then must monitor the $QT_c$ till steady state is achieved, in this case 5-6 doses, or 3 days in hospital with ECG monitoring. This is a costly, time intensive procedure and impractical when the goal is to rapidly convert AF or AFL.

U.S. Pat. No. 11,364,213 (US '213) involves a method of reducing the 3-day loading period for patients in need of chronic, oral dofetilide. Generally, these patients, who typically present with intermittent AF but are in current sinus rhythm, are given a first intravenous dofetilide dose followed by twice daily (BID) oral dofetilide. US '213 describes how the claimed method can assess the risk of dofetilide in the patient in one day or less, thereby reducing costs, e.g., hospital costs, for initiating chronic oral dofetilide therapy.

Atrial Fibrillation (AF) or Atrial Flutter (AFL) can be highly symptomatic and in patients with compromised myocardial function can lead to cardiac decompensation and possible death. Symptomatic AF/AFL can be terminated with the patient returning to normal sinus rhythm with pharmacologic therapy or electrical cardioversion. Dofetilide is known to be effective in converting AF/AFL and preventing recurrence of the arrhythmia. Dofetilide is approved by the U.S. Food and Drug Administration for conversion of symptomatic AF/AFL. However, administering the drug orally over several days, the currently approved methodology, is a substantial impediment to conversion, especially in situations where conversion is urgent given the patient's condition. A rapid infusion of an IV formulation of dofetilide would be effective in conversion, but dofetilide can cause excessive QT prolongation that can lead to the development of serious, life threatening ventricular arrhythmia of the Torsade de Pointe kind.

Thus, it would be beneficial to develop a method for the effective administration of an IV formulation of dofetilide that can be administered in a controlled way with careful patient assessment to avoid the precipitation of life threatening drug induced arrhythmias (pro-arrhythmia). This is especially needed in patients with reduced heart function since many drugs in patients with heart failure are more prone to precipitate life threatening arrhythmias. AF/AFL is frequent in patients with a reduced heart function and dofetilide in clinical studies was found not to increase life threatening arrhythmias in this heart failure population.

SUMMARY OF THE INVENTION

Accordingly, in an aspect, the invention involves a novel method of intravenously loading dofetilide in a patient with symptomatic AF or AFL to convert the arrhythmia to normal sinus rhythm.

In another aspect, the method involves intravenously administering a loading dose with a switch-over to oral dose for maintenance.

In another aspect, the method involves intravenously administering a loading dose of dofetilide, performing electrical cardioversion, and intravenously administering a maintenance dose of dofetilide with a switch-over to oral dose maintenance.

These and other objects, which will become apparent during the following detailed description, have been achieved by the inventors' discovery that intravenous dofetilide can be used to convert AF or AFL in a patient with symptomatic AF or AFL.

BRIEF DESCRIPTION OF THE DRAWINGS

FIG. 1 shows a graph of the estimated blood dofetilide concentration obtained with the dosage regimen of Example 1.

DETAILED DESCRIPTION OF THE INVENTION

All references cited herein are hereby incorporated in their entirety herein by reference.

Definitions

AF is atrial fibrillation.

AFL is atrial flutter, which is very similar to AF. Typically, the symptoms of a patient with AFL are more organized (e.g., the heart rate is less chaotic).

About is defined as +/−10% of the numerical value.

BID or bid or b.i.d. refers to twice-daily or once every 12 hours.

BP is blood pressure.

HR is heart rate.

IV means intravenous or intravenously.

Highly symptomatic AF/AFL refers to the level of symptoms shown by a patient. AF/AFL can be asymptomatic, symptomatic, or highly symptomatic. Symptomatic can include patients with palpitations, dizziness, reduced exercise capacity, and pre-syncope. Highly symptomatic refers to patients with symptoms reflecting more severe hemodynamic compromise. Highly symptomatic can include patients with shortness of breath (SOB), dyspnea, chest pain (angina), orthopnea, syncope (short term loss of consciousness), and diaphoresis.

Dofetilide

Prior studies have reported that a single dose of dofetilide, following a 10 min. infusion of 1.5 µg/kg yielded a peak plasma concentration of 1.74 ng/mL. (Sedgwick et al, Br. J. Clin Pharmacol 1991:31:515-519 and Rasmussen et al J. Cardiovascular Pharmacology 20:1992, S96-101.) An infusion of 3.0 µg/mL resulted in a plasma concentration of 5.35 ng/mL. (Sedgwick et al. and Rasmussen et al.) Coz and associates (Clin. Pharmacology & Therapeutics, 1995; 57(5) 533-54) reported that a 500 µg oral dose of dofetilide yielded a plasma concentration Cmax of 1.9 ng/mL. Thus, if a single dose reaches 70% of predicted steady state, at steady state, one can estimate Cmax ss to be 2.7 ng/mL, if 500 µg/mL was administered twice daily for at least 5 doses. If an IV dose of 1.5 µg/kg is known to result in a peak level of 1.7 ng/mL, a dose of 2.4 µg/kg, assuming linear kinetics, would reach a peak concentration of 2.7 ng/ml, exposing the patient to the peak serum concentration predicted for steady state and thus the maximum $QT_c$ prolongation. This would fully expose the patient to the potentially greatest arrhythmic risk in a short period of time, while monitored in hospital.

IV dofetilide kinetics are linear permitting a direct relationship between IV dose of dofetilide administered and serum concentration obtained. With IV administration one can avoid "overshoot" in serum concentration, avoiding excessive dofetilide blood levels and thus possible arrhythmias. The relationship between serum concentration and QT interval is well known, with a high degree of correlation.

AF/AFL Conversion

In view of the above, the invention involves a novel method of loading dofetilide to maximize patient safety by carefully obtaining a minimally requisite effective drug blood concentration ensuring that there is no excessive QT prolongation that can result in cardiac repolarization abnormalities resulting in life threatening ventricular arrhythmias.

Thus, in an aspect, the invention involves a novel method of converting atrial fibrillation (AF) or atrial flutter (AFL) in a patient who is highly symptomatic, comprising loading dofetilide intravenously (IV).

In some aspects, the IV dofetilide loading dose converts the patient to sinus rhythm. In these aspects, the patient is then switched over to oral dofetilide (e.g., BID).

In some aspects, the IV dofetilide loading dose fails to convert the patient to sinus rhythm. In these aspects, electrical cardioversion is performed. In some aspects, patients having received electrical cardioversion are unable to receive oral medication. In these aspects, an IV maintenance dose is administered until the patient can take oral medication. At that point the patient is then switched over to oral dofetilide (e.g., BID).

In another aspect, the invention involves a novel method of converting atrial fibrillation (AF) or atrial flutter (AFL) in a patient who presents with highly symptomatic AF or AFL, comprising:

a intravenously administering a loading dose of dofetilide to the patient who presents with highly symptomatic AF or AFL, wherein:
    (A) the loading dose is about 450-500 µg of dofetilide; and,
    (B) the loading dose is administered over about 30-60 minutes;
  b Chemical conversion: if the patient has converted to sinus rhythm, then about 0-4 h after completion of the IV loading dose, orally administering dofetilide every 12 h, the oral dose given being based on the creatinine clearance (CrCl) of the patient as given in the following table;

| CrCl | IV Maintenance Infusion (over 12 hrs) | Oral Dose (every 12 hrs) |
| --- | --- | --- |
| ≥60 mL/min | 450-500 µg | 500 µg |
| 40-<60 mL/min | 225-250 µg | 250 µg |
| 20-<40 mL/min | 100-125 µg | 125 µg |
| <20 mL/min | Dofetilide not indicated | Dofetilide not indicated | c Failed to chemically convert: alternatively, if the patient has not converted to sinus rhythm after completion of the IV loading infusion, then the patient is subjected to electrical cardioversion;
  d about 0-1 h after electrical cardioversion, a maintenance infusion of dofetilide is infused over 3-12 h, the maintenance dose given being based on the CrCl of the patient as given in the above table based on a 12 hour infusion;

e once the patient has recovered from electrical cardioversion and able to take dofetilide orally, stopping the IV maintenance dose; and, f about 2-6 h after stopping the IV maintenance dose, orally administering dofetilide every 12 h, the oral dose given being based on the CrCl of the patient as given in the above table;

provided that if the patient's $QT_c$ increases by 15% over the baseline $QT_c$ or if the $QT_c$ is measured at >500 msec or >550 msec if the patient has a ventricular conduction abnormality, the oral dose is reduced to 250 µg from 500 µg, 125 µg from 250 µg, or discontinued if originally 125 µg.

In some aspects, the $QT_c$ is measured prior to administration of dofetilide to establish a baseline $QT_c$ against which further $QT_c$ measurements can be compared. In some aspects, during the initial infusion the $QT_c$ is measured about every 15-30 minutes thereafter for 60 min and prior to the IV maintenance infusion and before each oral dose. These measurements can be discontinued once the physician observes that the patient is stable on dofetilide. For example, the $QT_c$ measurements can be discontinued after the loading infusion of dofetilide is completed. Alternatively, the $QT_c$ measurements can be discontinued after the first oral doses have been administered. The physician determines when to discontinue the $QT_c$ measurements. Examples of a sufficient number of oral doses include 1, 2, 3, 4, 5, to 6 oral doses. After 6 oral doses steady state is typically obtained and no further change in maximal serum dofetilide concentration or QT prolongation is expected.

In another aspect, the patient is monitored via electrocardiogramine the patient's $QT_c$.

In some aspects, the IV loading dose is about 450-500 µg of dofetilide. Examples include about 450, 455, 460, 465, 470, 475, 480, 485, 490, 495, to 500 µg of dofetilide. Typically, the loading dose chosen is an amount that achieves the predicted maximal serum concentration from orally administering 500 µg dofetilide.

In some aspects, the IV loading dose is given over about 30-60 minutes. Examples include about 30, 31, 32, 33, 34, 35, 36, 37, 38, 39, 40, 30, 41, 42, 43, 44, 45, 46, 47, 48, 49, 50, 30, 51, 52, 53, 54, 55, 56, 57, 58, 59, to 60 minutes.

A patient who is chemically converted with the IV dofetilide loading dose, can typically receive oral dofetilide.

A patient who requires electrical cardioversion, typically cannot take oral medication immediately after the procedure. In these aspects, an IV maintenance infusion of dofetilide is used employed. Once a patient is determined to have recovered enough from the electrical cardioversion to take dofetilide orally, the dofetilide IV maintenance infusion can be discontinued followed by a switch-over to oral dofetilide. It is the patient's physician or designate that determines when a patient can take dofetilide orally. Typically, a patient can take oral medication when they are awake and able to swallow with an intact gag reflex. In some aspects, this will be when the patient awakens after the procedure. In other aspects, the patient may require more time after waking to be able to swallow a pill without aspiration.

In another aspect, the IV maintenance infusion is started upon completion of the loading infusion. In another aspect, the IV maintenance infusion is started about 0, 0.5, 1, 1.5, 2, 2.5, 3, 3.5, 4, 4.5, 5, 5.5, to 6 h after completion of the loading dose.

The IV maintenance infusion, which typically is given for about 12 h, can be discontinued at any time. In another aspect, the maintenance infusion is administered for about 1, 2, 3, 4, 5, 6, 7, 8, 9, 10, 11, 12, 13, 14, 15, 16, 17, 18, 19, 20, 21, 22, 23, to 24 h. Additional examples include about 1.5, 2, 2.5, 3, 3.5, to 4 days (or sometimes longer).

The IV maintenance infusion can be discontinued if needed (e.g., due to an increase in the $QT_c$). This is an advantage of an IV versus an oral treatment. The IV maintenance infusion can be quickly stopped if the patient is having an adverse effect to dofetilide.

The IV maintenance infusion given is dependent upon the CrCl of the patient, as shown in the table below.

| Creatinine Clearance (CrCl) | IV Maintenance Infusion of Dofetilide (over 12 h) |
|---|---|
| 60 mL/min or more | 450-500 µg |
| 40-<60 mL/min | 225-250 µg |
| 20-<40 mL/min | 100-125 µg |
| <20 mL/min | Dofetilide not indicated |

For a patient with a CrCl of >60 mL/min, the IV maintenance dose is typically about 450-500 µg of dofetilide and is typically given over about 12 h (but can vary as noted above). Examples include about 450, 455, 460, 465, 470, 475, 480, 485, 490, 495, to 500 µg of dofetilide. This equates to about 0.625-0.694 µg/min of dofetilide (450/720 to 500/720). In another aspect, the IV maintenance dose is about 0.6, 0.61, 0.62, 0.63, 0.64, 0.65, 0.66, 0.67, 0.68, 069, to 0.7 µg/min.

For a patient with a CrCl of 40-<60 mL/min, the IV maintenance dose is typically about 225-250 µg of dofetilide and is typically given over about 12 h (but can vary as noted above). Examples include about 225, 230, 235, 240, 245, to 250 µg of dofetilide. This equates to about 0.313-0.347 µg/min of dofetilide (225/720 to 250/720). In another aspect, the IV maintenance dose is about 0.3, 0.31, 0.32, 0.33, 0.34, to 0.35 µg/min.

For a patient with a CrCl of 20-<40 mL/min, the IV maintenance dose is typically about 100-125 µg of dofetilide and is typically given over about 12 h (but can vary as noted above). Examples include about 100, 105, 110, 115, 120, to 125 µg of dofetilide. This equates to about 0.139-0.174 µg/min of dofetilide (100/720 to 125/720). In another aspect, the IV maintenance dose is about 0.13, 0.14, 0.15, 0.16, 0.17, to 0.18 µg/min.

In another aspect, the oral dose is started about 1, 2, 3, 4, 5, 6, 7, 8, 9, to 10 hours after the maintenance dose has been stopped. In another aspect, the oral dose is started about 3-6 hours after the maintenance dose has been stopped.

Oral dofetilide is available in capsule form in three sizes, 125, 250, and 500 µg. In another aspect, the patient is given dofetilide orally BID (once every 12 hours). Examples of these doses include 125, 250, 375 (e.g., 3×125 capsules or 125+250 capsules), and 500 µg.

The standard dose for patients having a creatinine clearance (CrCl)(or calculated GFR (glomerular filtration rate)) of >60 mL/min is 500 µg. However, per the table below, this dose is lowered if the patient's CRCL is <60 mL/min.

| Creatinine Clearance (CrCl) | Starting Oral Dose of Dofetilide |
|---|---|
| ≥60 mL/min | 500 µg bid |
| 40-<60 mL/min | 250 µg bid |
| 20-<40 mL/min | 125 µg bid |
| <20 mL/min | Dofetilide not indicated |

The oral dose of dofetilide is also reduced if warranted by the patient's $QT_c$. For example, if the patient's $QT_c$ increases by 15% over the baseline $QT_c$ or if the $QT_c$ is measured to be >500 msec or >550 msec in patients with ventricular conduction abnormalities, the oral dose of dofetilide is reduced to 250 µg from 500 µg, or 125 µg from 250 µg, or discontinued if the original dose was 125 µg.

For a patient with a CrCl of >60 mL/min, the twice-daily oral doses of dofetilide are 500 µg. In this aspect, the oral doses are reduced to 250 µg if the patient's $QT_c$ increased by 15% over baseline $QT_c$ or if the $QT_c$ is measured to be >500 msec or >550 msec if the patient has a ventricular conduction abnormality.

For a patient with a CrCl of 40-<60 mL/min, the twice-daily oral doses of dofetilide are 250 µg. In this aspect, the oral doses are reduced to 125 µg if the patient's $QT_c$ increased by 15% over baseline $QT_c$ or if the $QT_c$ is measured to be >500 msec or >550 msec if the patient has a ventricular conduction abnormality.

For a patient with a CrCl of 20-<40 ml/min, the twice-daily oral doses of dofetilide are 125 µg. In this aspect, the treatment is discontinued if the patient's $QT_c$ is increased by 15% over baseline $QT_c$ or if the $QT_c$ is measured to be >500 msec or >550 msec if the patient has a ventricular conduction abnormality.

In an alternative aspect, a patient with a CrCl of 20-<40 mL/min is given 125 µg of dofetilide orally once daily. This once-daily regimen is selected based on the judgment of the patient's physician. In this aspect, the treatment is discontinued if the patient's $QT_c$ is increased by 15% over baseline $QT_c$ or if the $QT_c$ is measured at >500 msec or >550 msec if the patient has a ventricular conduction abnormality.

In another aspect, the patient has a CrCl of >60 mL/min, the IV maintenance dose is about 450-500 µg of dofetilide and is given over about 12 h and the twice-daily oral doses of dofetilide are 500 µg. In this aspect, the oral doses are reduced to 250 µg if the patient's $QT_c$ increased by 15% over baseline $QT_c$ or if the $QT_c$ is measured to be >500 msec or >550 msec if the patient has a ventricular conduction abnormality.

In another aspect, the patient has a CrCl of 40-<60 mL/min, the IV maintenance dose is about 225-250 µg of dofetilide and is given over about 12 h and the twice-daily oral doses of dofetilide are 250 µg. In this aspect, the oral doses are reduced to 125 µg if the patient's $QT_c$ increased by 15% over baseline $QT_c$ or if the $QT_c$ is measured to be >500 msec or >550 msec if the patient has a ventricular conduction abnormality.

In another aspect, the patient has a CrCl of 20-<40 mL/min, the IV maintenance dose is about 100-125 µg of dofetilide and is given over about 12 h and the twice-daily oral doses of dofetilide are 125 µg. In this aspect, the treatment is discontinued if the patient's $QT_c$ is increased by 15% over baseline $QT_c$ or if the $QT_c$ is measured to be >500 msec or >550 msec if the patient has a ventricular conduction abnormality.

In some aspects, the patient has a CrCl of 20-<40 mL/min, the IV maintenance dose is about 100-125 µg of dofetilide and is given over about 12 h, and the once-daily oral dose of dofetilide is 125 µg. In this aspect, the treatment is discontinued if the patient's $QT_c$ is increased by 15% over baseline $QT_c$ or if the $QT_c$ is measured to be >500 msec or >550 msec if the patient has a ventricular conduction abnormality.

In some aspects, the BID oral dosing described herein is replaced by once daily oral dosing.

Examples of suitable intravenous formulations include those described in U.S. Pat. No. 11,364,213.

Examples of the concentration of a useful dofetilide intravenous solution includes about 1, 2, 3, 4, 5, 10, 15, 20, 25, 30, 35, 40, 45, 50, 55, 60, 65, 70, 75, 80, 85, 90, 95 to 100 µg/mL.

The invention may be embodied in other specific forms without departing from the spirit or essential attributes thereof. This invention encompasses all combinations of aspects of the invention noted herein. It is understood that any and all embodiments of the invention may be taken in conjunction with any other embodiment or embodiments to describe additional embodiments. It is also to be understood that each individual element of the embodiments is intended to be taken individually as its own independent embodiment. Furthermore, any element of an embodiment is meant to be combined with any and all other elements from any embodiment to describe an additional embodiment.

Other features of the invention will become apparent in the course of the following descriptions of exemplary embodiments that are given for illustration of the invention and are not intended to be limiting thereof.

EXAMPLES

Example 1

A 70 kg patient with a CrCl>60 mL/min presents with highly symptomatic atrial fibrillation (AF) and the patient's physician decides that the AF needs to be terminated with an infusion of dofetilide. The patient is admitted to the hospital and has continuously monitored ECG.

Chemical Cardioversion with Dofetilide:

The patient is then subjected to the following treatment with dofetilide.
  (A) Hour 0: Intravenous (IV) Loading Dose: 450 µg, infusion over 1 h measuring $QT_c$, HR, and BP every 15 minutes; and
  (B) Hour 1: Oral Dose: if the patent converts from the IV loading dose, then 500 µg is given orally every 12 hours (BID), started 1 h after the start of the IV loading infusion.

Electrical Cardioversion:

The patient is then subjected to the following treatment with dofetilide.
  (A) Hour 0: Intravenous (IV) Loading Dose: 450 µg, infusion over 1 h measuring $QT_c$, HR, and BP every 15 minutes;
  (B) Hour 1: Electrical Cardioversion. If the patient has not converted from the dofetilide IV loading dose, then the patient is the subjected to electrical cardioversion to convert to sinus rhythm.
  (C) Hour 1.5: IV Maintenance Dose: optionally, after electrical cardioversion, a 450 µg, 3-6 h infusion is started. This maintenance dose is stopped once the patient can take oral medication; and,
  (D) Hour 4-7: Oral Dose: 500 µg given orally every 12 hours (BID), started once the converted patient can receive oral medication-typically about 4-7 h after initiation of IV loading.

FIG. 1 shows the estimated blood dofetilide concentration obtained with the above described dosage regimen. The graph in FIG. 1 was obtained by modeling the above dosage regimen. The software packages NONMEM™ version 7.4 (ICON, Hanover, MD, USA) and MWpharm (Mediware, Prague. CZ)6 were used for the Bayesian PK modeling. PsN7 (Dept. of Pharmacy, Uppsala University, Uppsala, Sweden) was used for automation procedures. R (version 3.5.1, The R Foundation for Statistical Computing) was used for data preparation, graphical analysis, linear regression analysis, and statistical summaries. R package 'mrgsolve' was used for simulations.

Step (A): the loading dose, which in this example is a 450 µg IV infusion of dofetilide over 1 h, is expected to achieve the predicted maximal serum concentration that one would expect from 500 µg-dofetilide chronically dosed orally. Oral dosing would reach peak, after 6 doses twice daily of dofetilide. The peak dofetilide concentration will be reached at termination of infusion.

$QT_c$ would be measured every 15 mins during the infusion.

Step (B): the IV maintenance dose of a 450 µg IV infusion of dofetilide over 12 h (0.625 µg/min) is initiated at the end of the 1 h loading IV. This dose can be maintained until the patient is awake and able to take dofetilide orally.

Once the patient can take dofetilide orally, the dofetilide maintenance IV is stopped. Starting about 3 h after stopping the maintenance IV, an oral dose of 500 µg of dofetilide is administered every 12 h (BID).

If the $QT_c$ has increased by 15% over baseline $QT_c$ or if a $QT_c$>500 msec is observed (550 msec in patients with ventricular conduction abnormalities), subsequent oral doses would be reduced to 250 µg BID (or lower if the original oral dose called for is lower, see below).

It is noted that if patients present with a lower than normal CrCl, the initial target concentration would be the same, but the oral (maintenance) dose administered would be lower; 250 µg or 125 µg BID (based on the chart below).

| Creatinine Clearance (CrCl) | Oral Dose of Dofetilide |
|---|---|
| ≥60 mL/min | 500 µg bid |
| 40-<60 mL/min | 250 µg bid |
| 20-<40 mL/min | 125 µg bid |
| <20 mL/min | Dofetilide not indicated |

Further, in patients that show excessive $QT_c$ prolongation at initial loading (>500 msec or >550 msec in patients with ventricular conduction abnormalities), the first oral dose would be reduced to 250 µg (or 125 µg if starting oral dose was 250 µg based on the above chart) and the peak concentration expected in 4 h with $QT_c$ re-evaluated. The longest $QT_c$ will be measured at peak concentration at the end of the loading infusion and will be the same peak seen with chronic oral dosing of 250 µg. This would permit the measurement of the $QT_c$ response at the highest dofetilide concentration projected that the patient would be exposed to chronically to maintain normal sinus rhythm, thus establishing safety of chronic dofetilide dosing.

Example 2

A 75 kg patient with a CrCl of 45 mL/min presents with highly symptomatic atrial fibrillation (AF) and the patient's physician decides that the AF needs to be terminated with an infusion of dofetilide. The patient is admitted to the hospital and has an ECG continuously monitored.

Chemical Cardioversion with Dofetilide:
The patient is then subjected to the following treatment with dofetilide.
(A) Hour 0: Intravenous (IV) Loading Dose: 450 µg, infusion over 1 h measuring $QT_c$, HR, and BP every 15 minutes; and
(B) Hour 1: Oral Dose: if the patent converts from the IV loading dose, then 250 µg is given orally every 12 hours (BID), started 1 h after the start of the IV loading infusion.

Electrical Cardioversion:
The patient is then subjected to the following treatment with dofetilide.
(A) Hour 0: Intravenous (IV) Loading Dose: 450 µg, infusion over 1 h measuring $QT_c$, HR, and BP every 15 minutes;
(B) Hour 1: Electrical Cardioversion. If the patient has not converted from the dofetilide IV loading dose, then the patient is subjected to electrical cardioversion to convert to sinus rhythm.
(C) Hour 1.5: IV Maintenance Dose: optionally, after electrical cardioversion, a 225 µg, 3-6 h infusion is started. This maintenance dose is stopped once the patient can take oral medication; and,
(D) Hour 4-7: Oral Dose: 250 µg given orally every 12 hours (BID), started once the converted patient can receive oral medication-typically about 4-7 h after initiation of IV loading.

Numerous modifications and variations of the invention are possible in light of the above teachings. It is therefore to be understood that within the scope of the appended claims, the invention may be practiced otherwise than as specifically described herein.

What is claimed is:

1. A method of converting atrial fibrillation (AF) or atrial flutter (AFL) in a patient who presents with highly symptomatic AF or AFL, comprising:
   a subjecting a patient to electrical cardioversion, wherein the patient has a Creatinine Clearance (CrCl) of ≥20 mL/min and has not converted to sinus rhythm following a chemical cardioversion, wherein the chemical cardioversion, comprised:
   intravenously administering a loading dose of dofetilide to the patient who presents with highly symptomatic AF or AFL, wherein:
   (A) the loading dose is about 450-500 ug of dofetilide; and,
   (B) the loading dose is administered over about 30-60 minutes;
   b from 0 to about 1 h after conversion with electrical cardioversion, intravenously administering a maintenance dose of dofetilide for about 12 h, the maintenance dose is given being on the CrCl of the patient using the table below:

| CrCl | IV Maintenance Dose | Oral Dose |
|---|---|---|
| ≥60 mL/min | 450-500 µg | 500 µg |
| 40-<60 mL/min | 225-250 µg | 250 µg |
| 20-<40 mL/min | 100-125 µg | 125 µg | c once the patient has recovered from the electrical cardioversion and able to take dofetilide orally, stopping the IV maintenance dose; and,
   d about 2-6 h after stopping the IV maintenance dose, orally administering dofetilide every 12 h at the oral dose based on the CrCl of the patient in the above table; provided that when:
   (i) the patient's QTc increases by 15% over the baseline QTc; or, (ii) the QTc is measured at >500 msec and the patient does not have a ventricular conduction abnormality; or,
(iii) the QTc is measured at >550 msec and the patient has a ventricular conduction abnormality:
the oral dose is reduced to 250 μg from 500 ug, 125 μg from 250 μg, or discontinued if originally 125 μg.

2. The method of claim 1, further comprising:
measuring the $QT_c$ of the patient prior to the IV loading dose of dofetilide to establish a baseline $QT_c$ and then measuring the $QT_c$ about every 15-30 minutes thereafter for 60 min and prior to the IV maintenance infusion and before each oral dose.

3. The method of claim 1, wherein the loading dose is about 450 μg.

4. The method of claim 1, wherein the loading dose is about 460 μg.

5. The method of claim 1, wherein the loading dose is about 470 μg.

6. The method of claim 1, wherein the loading dose is about 480 μg.

7. The method of claim 1, wherein the loading dose is about 490 μg.

8. The method of claim 1, wherein the loading dose is about 500 μg.

9. The method of claim 1, wherein the loading dose is administered over about 30 minutes.

10. The method of claim 1, wherein the loading dose is administered over about 40 minutes.

11. The method of claim 1, wherein the loading dose is administered over about 50 minutes.

12. The method of claim 1, wherein the loading dose is administered over about 60 minutes.

13. The method of claim 1, wherein the maintenance dose is started 0 h after conversion with electrical cardioversion.

14. The method of claim 1, wherein the maintenance dose is started about 1 h after conversion with electrical cardioversion.

15. The method of claim 1, wherein the patient has a CrCl of ≥60 mL/min.

16. The method of claim 15, wherein the oral doses are reduced to 250 μg because:
    (i) the patient's QTc increases by 15% over the baseline QTc; or,
    (ii) the QTc is measured at >500 msec and the patient does not have a ventricular conduction abnormality; or,
    (iii) the QTc is measured at >550 msec and the patient has a ventricular conduction abnormality.

17. The method of claim 1, wherein the patient has a CrCl of 40-<60 mL/min.

18. The method of claim 17, wherein the oral doses are reduced to 125 μg because:
    (i) the patient's QTc increases by 15% over the baseline QTc; or,
    (ii) the QTc is measured at >500 msec and the patient does not have a ventricular conduction abnormality; or,
    (iii) the QTc is measured at >550 msec and the patient has a ventricular conduction abnormality.

19. The method of claim 1, wherein the patient has a CrCl of 20-<40 mL/min.

20. The method of claim 19, wherein the oral doses are discontinued because:
    (i) the patient's QTc increases by 15% over the baseline QTc; or,
    (ii) the QTc is measured at >500 msec and the patient does not have a ventricular conduction abnormality; or,
    (iii) the QTc is measured at >550 msec and the patient has a ventricular conduction abnormality.

* * * * *